US008391509B2

(12) United States Patent
Lee et al.

(10) Patent No.: US 8,391,509 B2
(45) Date of Patent: Mar. 5, 2013

(54) AUDIO-SEPARATING APPARATUS AND OPERATION METHOD THEREOF

(75) Inventors: Yi-Hsuan Lee, Taichung (TW); Charles Tak-Ming Choi, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 736 days.

(21) Appl. No.: 12/626,860

(22) Filed: Nov. 27, 2009

(65) Prior Publication Data

US 2011/0026736 A1 Feb. 3, 2011

(30) Foreign Application Priority Data

Aug. 3, 2009 (TW) ................................ 98126108 A

(51) Int. Cl.
*H04B 15/00* (2006.01)
*H04R 29/00* (2006.01)

(52) U.S. Cl. .......... 381/94.7; 381/56; 704/226; 704/233

(58) Field of Classification Search ................. 381/94.7, 381/56, 23.1, 310, 301; 704/226-228, 233
See application file for complete search history.

(56) References Cited

U.S. PATENT DOCUMENTS

2003/0014248 A1* 1/2003 Vetter ............................ 704/226

* cited by examiner

*Primary Examiner* — Vivian Chin
*Assistant Examiner* — Douglas Suthers
(74) *Attorney, Agent, or Firm* — WPAT, P.C.; Anthony King

(57) ABSTRACT

This present invention discloses an audio-separating apparatus and operation method thereof. The audio-separating apparatus applies both blind source separation and noise reduction mechanisms. The audio-separating apparatus only uses one microphone to record mixed sound signals. After applying the noise reduction mechanism, noise reduced signals and the mixed sound signals are used as the inputs of the blind source separation. The method may avoid the spatial aliasing effect caused by using a microphone array to record the mixed sound signals. Besides, speech segment losses caused by processing the noise reduction will be effectively recovered, which may help the hearing impaired recognize target speech signals.

15 Claims, 8 Drawing Sheets

AUDIO-SEPARATING APPARATUS AND OPERATION METHOD THEREOF

BACKGROUND OF THE INVENTION (a) Field of the Invention

The present invention relates to an audio-separating apparatus and an operation method thereof, and more particularly to an audio-separating apparatus applying both blind signal separation (BSS) and noise reduction mechanisms and an operation method thereof.

(b) Description of the Prior Art

Various noises, such as echoes, reverberations and the like, are omnipresent in people's daily lives, and all such noises would cause interference with sound signals. When sound signals are interfered by an interference source, the quality of the sound signals will degrade. For the hearing impaired who use hearing aids or cochlear implant, it is extremely difficult to recognize the sounds to be heard in a noise-filled environment without noise reduction or noise separation. Therefore, more and more emphases have been gradually put on noise reduction algorithms based on digital signal processing to obtain clearer sounds.

In order to obtain clearer sounds, many noise reduction algorithms, such as independent component analysis (ICA), have been derived. The speech signals to be heard can be retrieved from a noise-filled environment by the algorithm to enhance the speech signals. In the prior art, the disclosure of US200713381 indicates that speech signals can be retrieved from a noise-filled environment via an ICA method. Nonetheless, conventional noise reduction algorithms and ICA still have some drawbacks. It is easy to lose portions of speech segments and produce musical noises during the processing in many conventional noise reduction methods. Such effect leads to reduced quality of speech; in other word, it is difficult to recognize speech signals. Furthermore, when ICA is used, at least two microphones are required to record sound signals. However, sound propagates at a substantially slower speed. If the microphones are placed at different positions, the time taken for a signal to be transferred from each sound source to each microphone is unequal. This causes the propagation delay between sampling points, referred to as the spatial aliasing effect. However, the spatial aliasing effect is not taken into consideration in the theoretical basis of ICA. Therefore, significant effect in the separation of sound signals by using ICA can not be well achieved.

SUMMARY OF THE INVENTION

In view of the above-mentioned problems in the prior art, an object of the present invention is to provide an audio-separating apparatus and an operation method thereof for solving the spatial aliasing effect caused by using two microphones to record sound signals.

According to one object of the present invention, there is provided an audio-separating apparatus comprising: a receiving unit, a first buffer unit, a second buffer unit, a noise reducing unit, a learning unit, and an audio-separating unit. The receiving unit is used to receive a mixed sound signal. The first buffer unit is connected to the receiving unit, and the mixed sound signal is stored as a first mixed sound signal therein. The second buffer unit is connected to the receiving unit, and the mixed sound signal is stored as a second mixed sound signal therein, and it has a buffer capacity different from that of the first buffer unit. The noise reducing unit is connected to the first buffer unit and the second buffer unit for receiving the first mixed sound signal and the second mixed sound signal, as well as uses a noise reduction algorithm to respectively generate a first noise reduced sound signal and a second noise reduced sound signal. The learning unit is connected to the first buffer unit and the noise reducing unit. The learning unit uses the first mixed sound signal and the first noise reduced sound signal to generate an audio separation parameter by means of a blind source separation algorithm. The audio-separating unit is connected to the noise reducing unit, the second buffer unit and the learning unit. The audio-separating unit uses the second mixed sound signal, the second noise reduced sound signal and the audio separation parameter to separate the mixed sound signal.

The audio-separating apparatus further comprises an output unit for outputting a separated sound signal. The separated sound signal is a sound signal separated from the mixed sound signal and accordingly obtained.

The buffer capacity of the first buffer unit is greater than the buffer capacity of the second buffer unit.

The audio-separating unit processes the second mixed sound signal and the second noise reduced sound signal in real-time to separate the mixed sound signal in real-time.

The blind source separation (BSS) algorithm further comprises an independent component analysis (ICA) algorithm to generate the audio separation parameter.

The audio separation parameter is a matrix parameter.

The receiving unit is a microphone for receiving the mixed sound signal.

According to another object of the present invention, an operation method of an audio-separating apparatus is provided comprising the following steps. At first, a receiving unit is used to receive a mixed sound signal. Next, the mixed sound signal is stored as a first mixed sound signal in the first buffer unit. Next, the mixed sound signal is stored as a second mixed sound signal in the second buffer unit. The second buffer unit has a buffer capacity different from that of the first buffer unit. Next, the noise reducing unit receives the first mixed sound signal and the second mixed sound signal. Thereafter, the noise reducing unit uses a noise reduction algorithm to respectively generate a first noise reduced sound signal and a second noise reduced sound signal. Next, the learning unit uses the first mixed sound signal and the first noise reduced sound signal to generate an audio separation parameter by means of a blind source separation algorithm. At Last, the audio-separating unit uses the second mixed sound signal, the second noise reduced sound signal and the audio separation parameter to separate the mixed sound signal. Wherein the step of generating the audio separation parameter and the step of separating the mixed sound signal can be simultaneously performed, so that a separated sound signal can be output in real-time.

The method further comprises a step of outputting a separated sound signal through an output unit. The separated sound signal is a sound signal separated from the mixed sound signal and accordingly obtained.

The buffer capacity of the first buffer unit is greater than the buffer capacity of the second buffer unit.

The audio-separating unit processes the second mixed sound signal and the second noise reduced sound signal in real-time to separate the mixed sound signal in real-time.

The blind source separation (BSS) algorithm further comprises an independent component analysis (ICA) algorithm to generate the audio separation parameter.

The audio separation parameter is a matrix parameter.

When the receiving unit is a microphone, the microphone is used to receive the mixed sound signal.

As described above, the audio-separating apparatus and the operation method thereof according to the present invention may have one or more of the following advantages:

(1) The audio-separating apparatus and the operation method thereof only use one microphone to record mixed sound signals, so as to avoid the spatial aliasing effect caused by using a microphone array to record the mixed sound signals.

(2) The audio-separating apparatus and the operation method thereof improve the signal-to-noise ratio (SNR). This helps the patients who use hearing aids or cochlear implant to hear clear sounds.

(3) In the prior art, an independent component analysis (ICA) method needs more than two microphones to receive signals from signal sources. The audio-separating apparatus and the operation method thereof only use one microphone to record mixed sound signals through both blind source separation and noise reduction mechanisms.

DETAILED DESCRIPTION OF THE PREFERRED EMBODIMENTS

Figure 1:
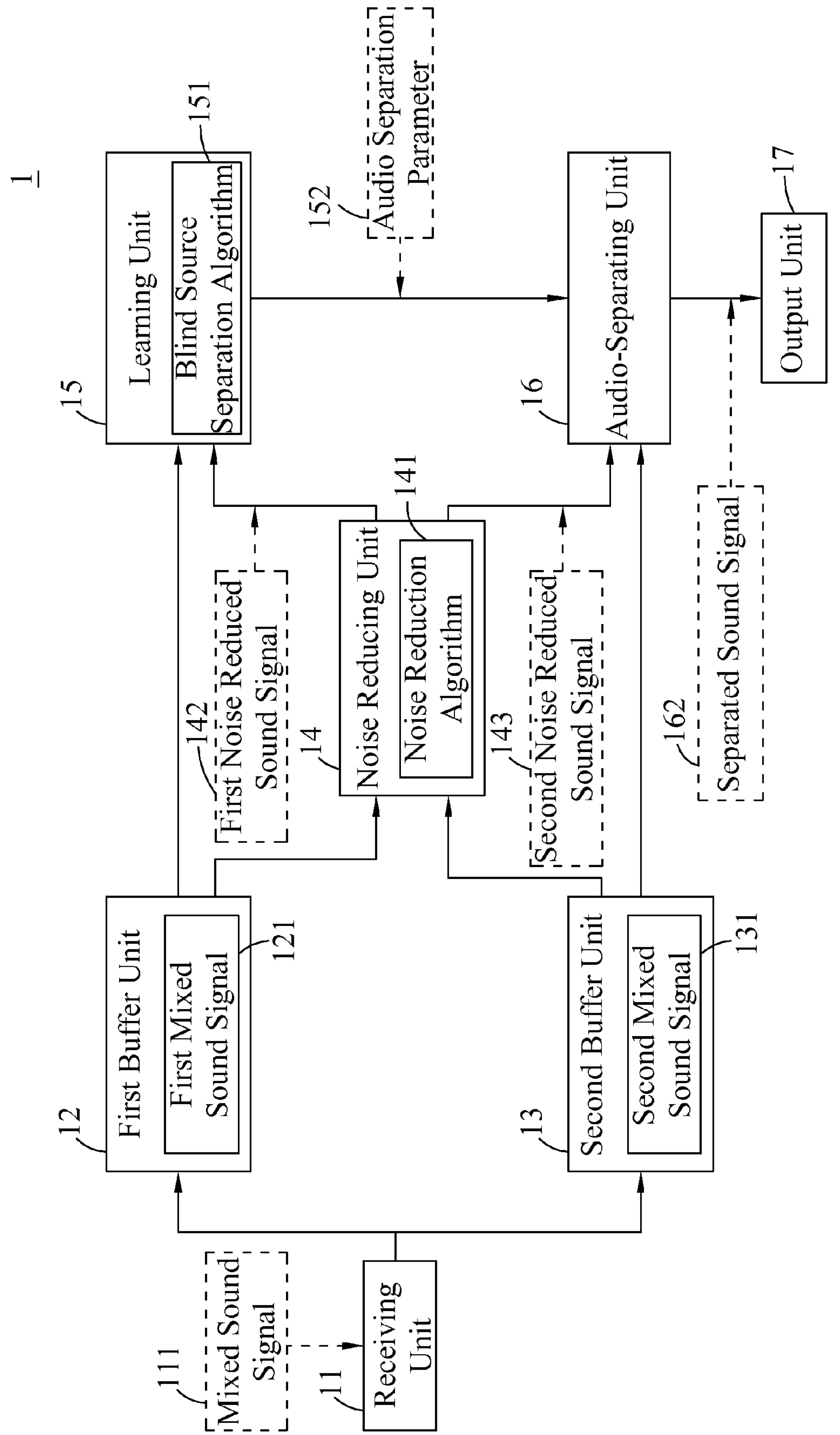
FIG. 1 is a schematic view of an audio-separating apparatus according to the present invention.

Referring to FIG. 1, a schematic view of an audio-separating apparatus according to the present invention is illustrated. In this figure, the audio-separating apparatus 1 comprises a receiving unit 11, a first buffer unit 12, a second buffer unit 13, a noise reducing unit 14, a learning unit 15, an audio-separating unit 16, and an output unit 17.

The receiving unit 11 is a microphone for receiving mixed sound signals 111. The mixed sound signals 111 can be sound signals from a plurality of signal sources. Since only one microphone is used to receive mixed sound signals, it is impossible to cause the spatial aliasing effect.

The first buffer unit 12 is connected to the receiving unit 11, and the mixed sound signals 111 are stored as first mixed sound signals 121 therein. The second buffer unit 13 is connected to the receiving unit 11, and the mixed sound signals 111 are stored as second mixed sound signals 131 therein. The buffer capacity of the second buffer unit 13 is less than the buffer capacity of the first buffer unit 12. As a result, longer mixed sound signals 111 can be stored in the first buffer unit 12, and shorter mixed sound signals 111 are stored in the second buffer unit 13.

The noise reducing unit 14 is connected to the first buffer unit 12 and the second buffer unit 13 for receiving the first mixed sound signal 121 and the second mixed sound signal 131, as well as uses a noise reduction algorithm 141 to respectively generate a first noise reduced sound signal 142 and a second noise reduced sound signal 143. The goal of the noise reduction algorithm 141 is to reduce noises. Also, the mixed sound signals 111 can be processed by means of speech enhancement methods.

The learning unit 15 is connected to the first buffer unit 12 and the noise reducing unit 14 for receiving the first mixed sound signal 121 and the first noise reduced sound signal 142. The learning unit 15 uses a blind source separation algorithm 151 to generate a learning result from the first mixed sound signal 121 and the first noise reduced sound signal 142. It is assumed that there are m sound sources (s) and n received mixed signals (x). The n received signals are used to separate the m sound sources under the condition that the signal characteristics are unknown; i.e. the blind source separation (BSS) algorithm. This can be represented by the mathematical expression as below: $X_{nx1}=A_{nxm}S_{mx1}$, where A is a mixing matrix and influenced by environmental factors. In practical applications, it can be assumed that m sound sources are mutually independent. Therefore, the de-mixing matrix $W\approx A^{-1}$ can be obtained using an independent component analysis method, and is obtained a separated signal Y, which is similar to S and represented by the following equation: $Y_{mx1}=W_{mxn}X_{nx1}\approx S$. Therefore, it can be assumed that the de-mixing matrix $W=A^{-1}$. At this time, the obtained separated signal Y=S is represented by the following equation: $Y_{mx1}=W_{mxn}X_{nx1}$. Therefore, the learning unit 15 can generate an audio separation parameter 152 by means of the blind source separation algorithm 151. The audio separation parameter 152 can be a matrix parameter, i.e. the de-mixing matrix W.

The audio-separating unit 16 is connected to the second buffer unit 13, the noise reducing unit 14 and the learning unit 15, so the audio-separating unit 16 can receive the second mixed sound signal 131, the second noise reduced sound signal 143 and the blind signal separation parameter 152 in order to obtain a separated signal. When the audio-separating unit 16 has not received an audio separation parameter 152 yet, a default parameter should be used or alternatively the signal is directly outputted without separation. The audio-separating unit 16 can use the second mixed sound signal 131 and the second noise reduced sound signal 143 to obtain a separated signal. When the audio-separating unit 16 receives an audio separation parameter 152, the audio-separating unit 16 can obtain the de-mixing matrix W from the learning unit 15 and perform an operation on the mixed signal X to obtain a separated signal Y, as the above-mentioned $Y_{mx1}=W_{mxn}X_{nx1}$. Therefore, the audio-separating unit 16 can use the second mixed sound signal 131, the second noise reduced sound signal 143 and the audio separation parameter 152 to separate the mixed sound signal 111.

The audio-separating apparatus 1 further comprises an output unit 17 for outputting a separated sound signal 162. The separated sound signal 162 is a sound signal separated from the mixed sound signal 111 and accordingly obtained. In the present invention, there are provided two buffer units of different sizes wherein the buffer capacity of the second buffer unit 13 is less than the buffer capacity of the first buffer unit 12. The audio-separating unit 16 can process the second mixed sound signal 131 and the second noise reduced sound signal 143 in real-time, and outputs the separated sound signal 162 through the output unit 17 in real-time. Furthermore, in order that the learning unit 15 acquires a better learning result by learning for a longer duration of time, there can be provided a first buffer unit 12 which has a larger buffer capacity to generate better audio separation parameters so that the audio-separating unit 16 offers better audio separation ability.

Figure 2:
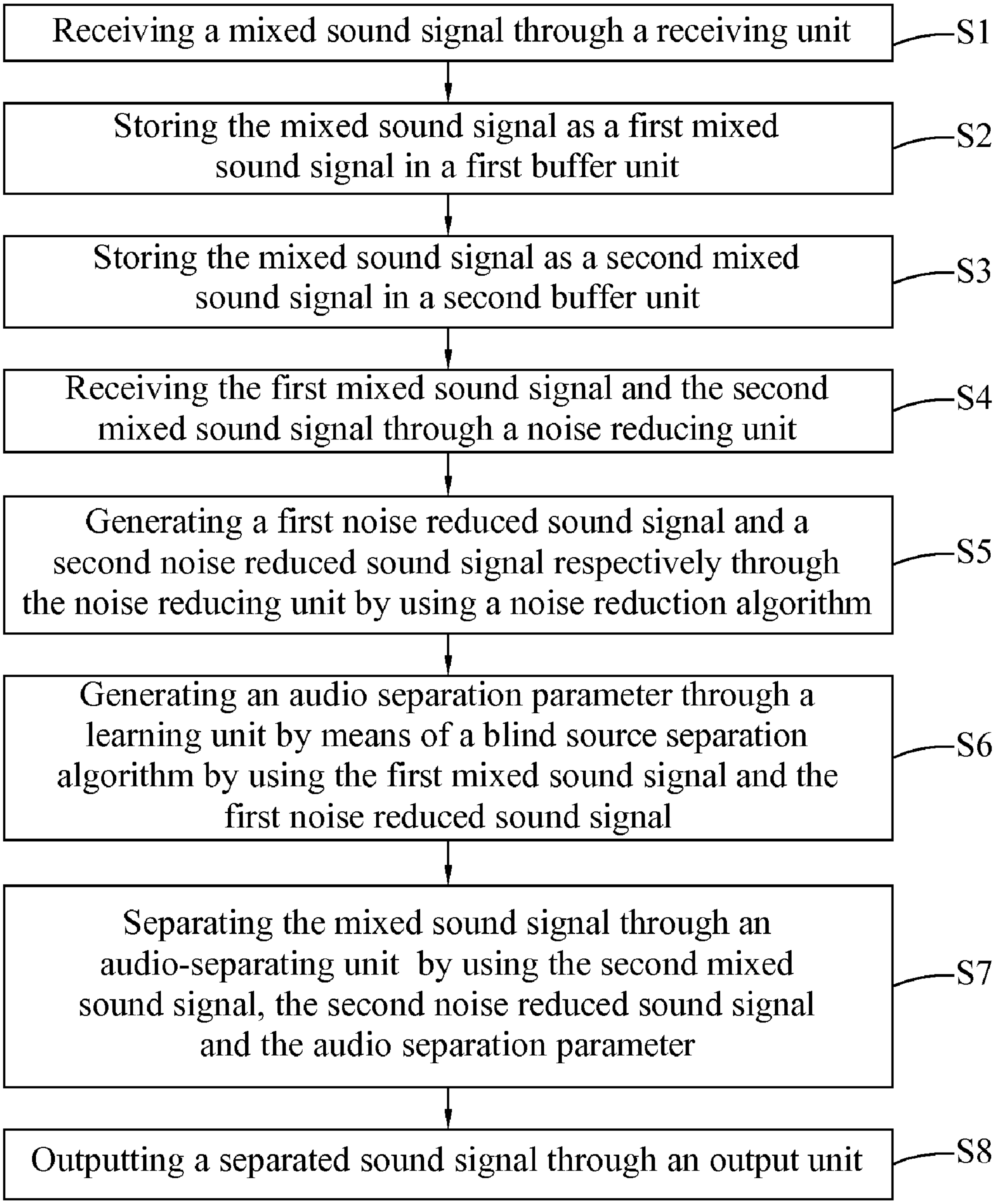
FIG. 2 is a flow chart showing the steps of an operation method of an audio-separating apparatus according to the present invention.

Referring to FIG. 2, a flow chart showing the steps of an operation method of an audio-separating apparatus according to the present invention is illustrated. In step S1, a receiving unit is used to receive a mixed sound signal. When the receiving unit only uses one microphone, the microphone can receive mixed sound signals to avoid the spatial aliasing effect caused by using a plurality of microphones in the prior art. In step S2, the mixed sound signal is stored as a first mixed sound signal in the first buffer unit. In step S3, the mixed sound signal is stored as a second mixed sound signal in the second buffer unit. The buffer capacity of the second buffer unit is different from that of the first buffer unit. In step S4, the noise reducing unit receives the first mixed sound signal and the second mixed sound signal. In step S5, the noise reducing unit uses a noise reduction algorithm to respectively generate a first noise reduced sound signal and a second noise reduced sound signal. In step S6, the learning unit uses the first mixed sound signal and the first noise reduced sound signal to generate an audio separation parameter by means of a blind source separation algorithm. In step S7, the audio-separating unit uses the second mixed sound signal, the second noise reduced sound signal and the audio separation parameter to separate the mixed sound signal. The method further comprises an output step S8 for outputting a separated sound signal through an output unit.

Figure 3:
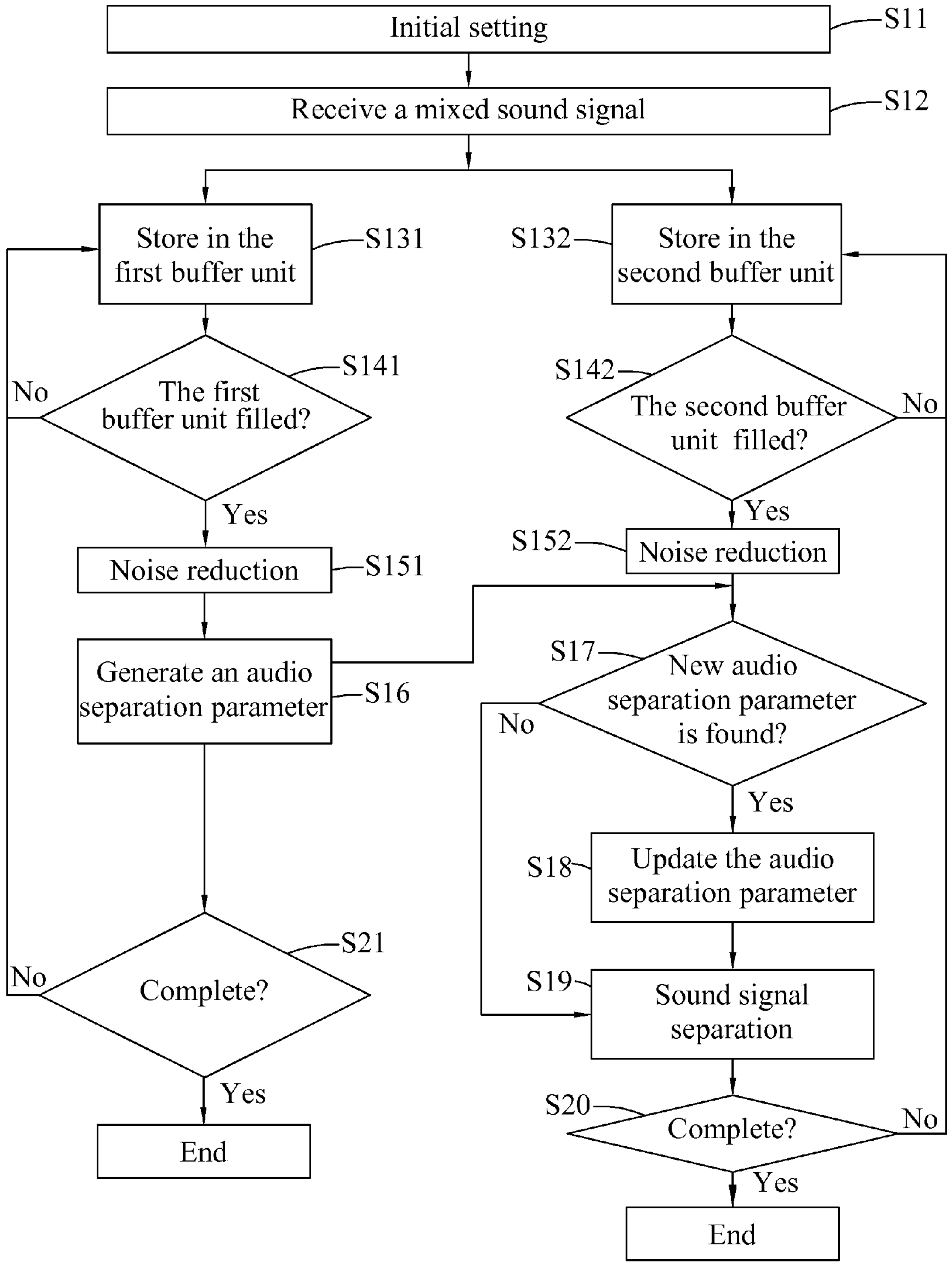
FIG. 3 is a flow chart showing the steps of an operation method of an audio-separating apparatus according to another embodiment of the present invention.

Referring to FIG. 3, a flow chart showing the steps of an operation method of an audio-separating apparatus according to another embodiment of the present invention is illustrated. In step S11, an initial value is set. In this step, the buffer length of the first mixed sound signal of the first buffer unit and the buffer length of the second mixed sound signal of the second buffer unit, as well as the duration of time in which the learning unit may learn, can be designated. The longer the learning time is, the better the learning result can be obtained, so as to generate more preferable audio separation parameters.

In step S12, a receiving unit is used to receive a mixed sound signal. In step S131, the sound signal is stored in the first buffer unit. In step S132, the sound signal is stored in the second buffer unit. In step S141, it is determined whether or not the first buffer unit is full. When it is determined that the first buffer unit is full, the first mixed sound signals are processed. If not, then the sound signal continues to be stored in the first buffer unit.

In step S142, it is determined whether or not the second buffer unit is full of the second mixed sound signals. When it is determined that the second buffer unit is full, the second mixed sound signals are processed. If not, the sound signal continues to be stored in the second buffer unit. In step S151, noise reduction is performed. This step can carried by the noise reducing unit, which uses a noise reduction algorithm to perform a noise reduction operation on the first mixed sound signals, so as to generate first reduced sound signals. In step S152, noise reduction is performed. This step can be carried out by the noise reducing unit, which uses a noise reduction algorithm to perform a noise reduction operation on the second mixed sound signals, so as to generate second reduced sound signals.

In step S16, an audio separation parameter is generated. In this step, the learning unit uses the first mixed sound signal and the first noise reduced sound signal to generate an audio separation parameter by means of a blind source separation algorithm, and also transmits the new audio separation parameter to the audio-separating unit. The receiving unit continues to receive signals. When the first buffer unit is full, the procedures such as noise reduction and generation of audio separation parameters are conducted. As a result, the audio separation parameter is continuously updated so a new audio separation parameter is generated during each iterative process.

In step S17, it is determined whether or not a new audio separation parameter is received. When the audio-separating unit determines that a new audio separation parameter is received, step S18 is conducted to update the audio separation parameter. Also, step S19 is conducted to separate the sound signal. An operation is performed on the updated audio separation parameter and the mixed sound signal to obtain a separated signal. When the audio-separating unit determines that the audio separation parameter has not been received yet, step S19 is directly carried out to separate the sound signal. Steps S20 and S21 are conducted to determine whether or not the procedure ends. When the user intends to end the audio separation procedure, the audio-separating apparatus can be turned off and the operation ends at the same time. When the user continues to operate the audio-separating apparatus, it returns to step S131 and S132 to store sound signals in the first buffer unit and the second buffer unit.

Figure 4:
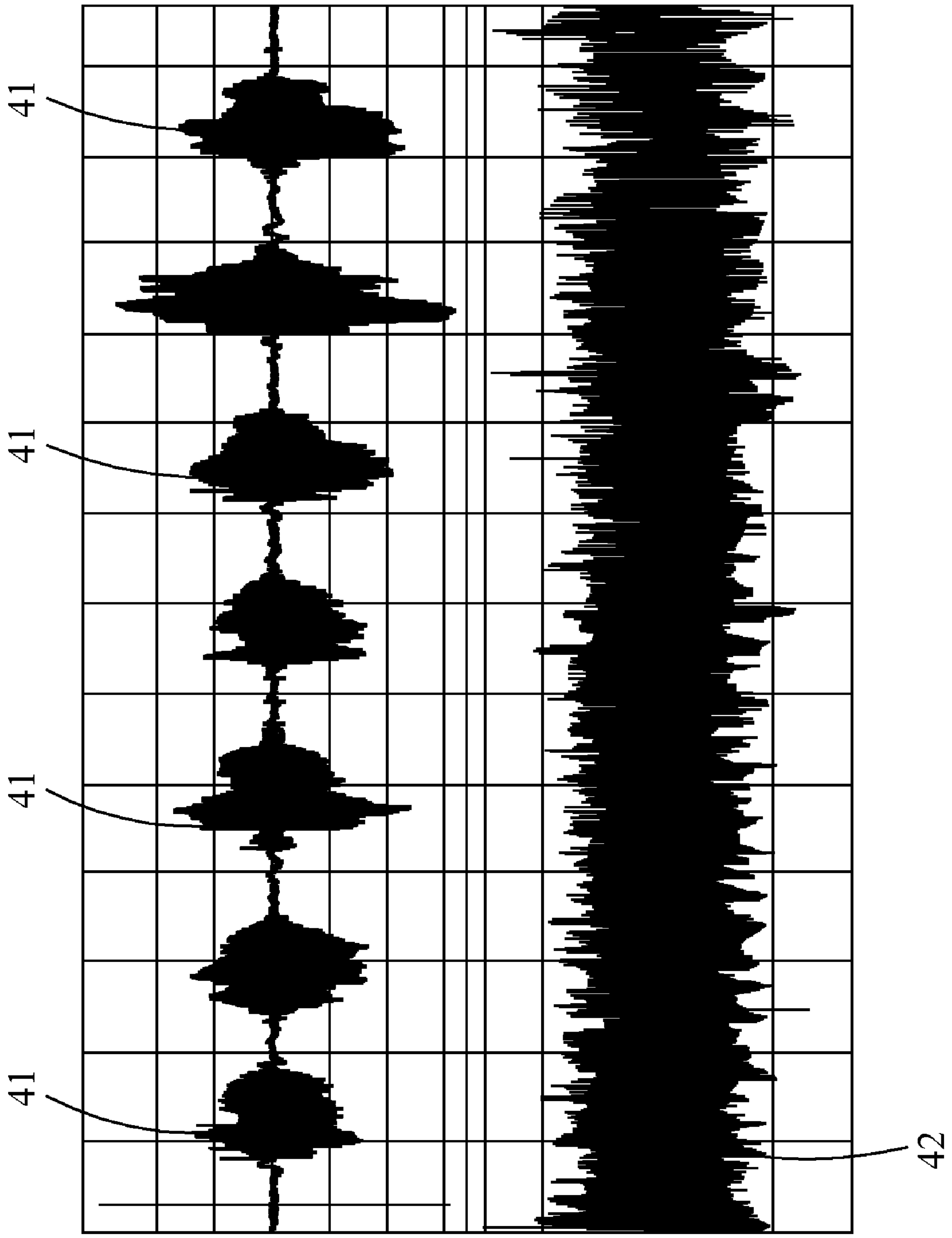
FIG. 4 is a signal diagram of two signal sources.
Figure 5:
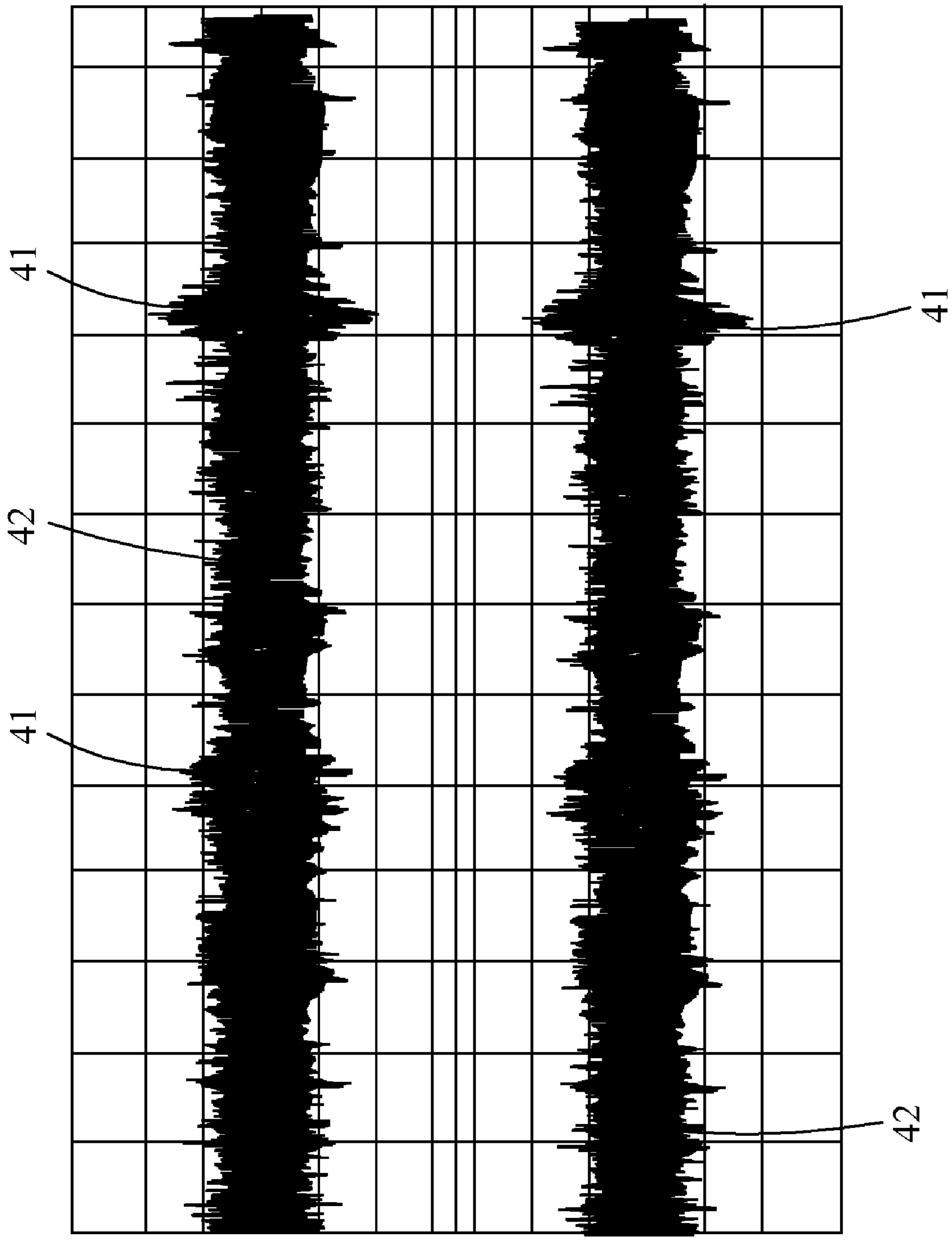
FIG. 5 is a signal diagram of the signals from two signal sources, which signals being recorded respectively by using two microphones.
Figure 6:
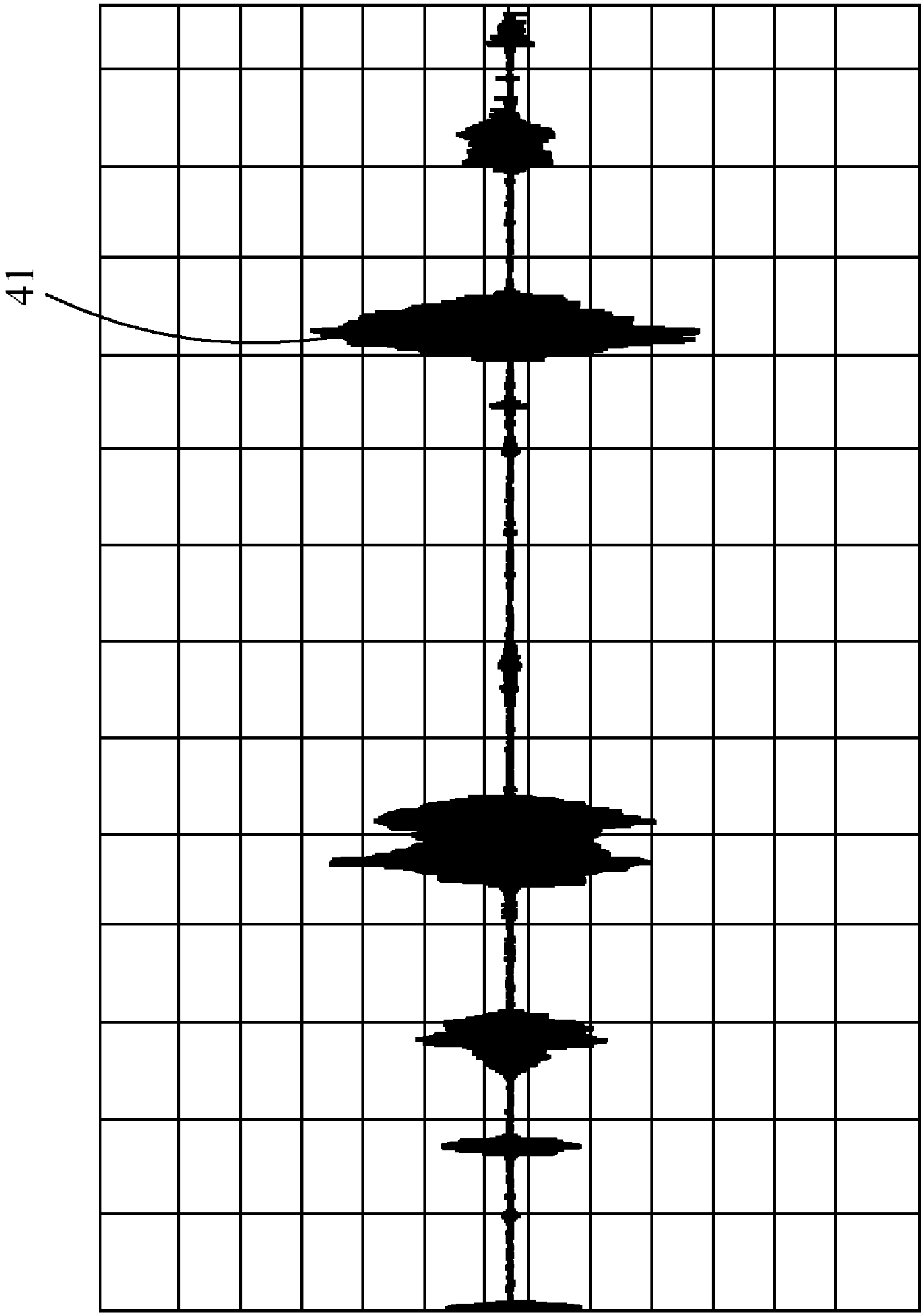
FIG. 6(PRIOR ART)
FIG. 6 is a signal diagram of the signals recorded by a microphone through the application of a Wiener filter according to the prior art.

Referring to FIG. 4, a signal diagram of two signal sources is illustrated. In this figure, the upper signals are speech signals 41, and the lower signals are noise signals 42. Referring to FIG. 5, there is illustrated a signal diagram of the signals from two signal sources, wherein the signals are recorded respectively by using two microphones. According to this figure, the two microphones are placed only 1 centimeter apart. Thus, the signal diagrams of the signals recorded by the two microphones are similar. Referring to FIG. 6, there is illustrated a signal diagram of the signals (as illustrated in FIG. 5) recorded by a microphone through the application of a Wiener filter according to the prior art. Compared to FIG. 4, it can be found that the filter has filtered out the noise signals 42, but some segments of the speech signals 41 have also been lost.

Figure 7:
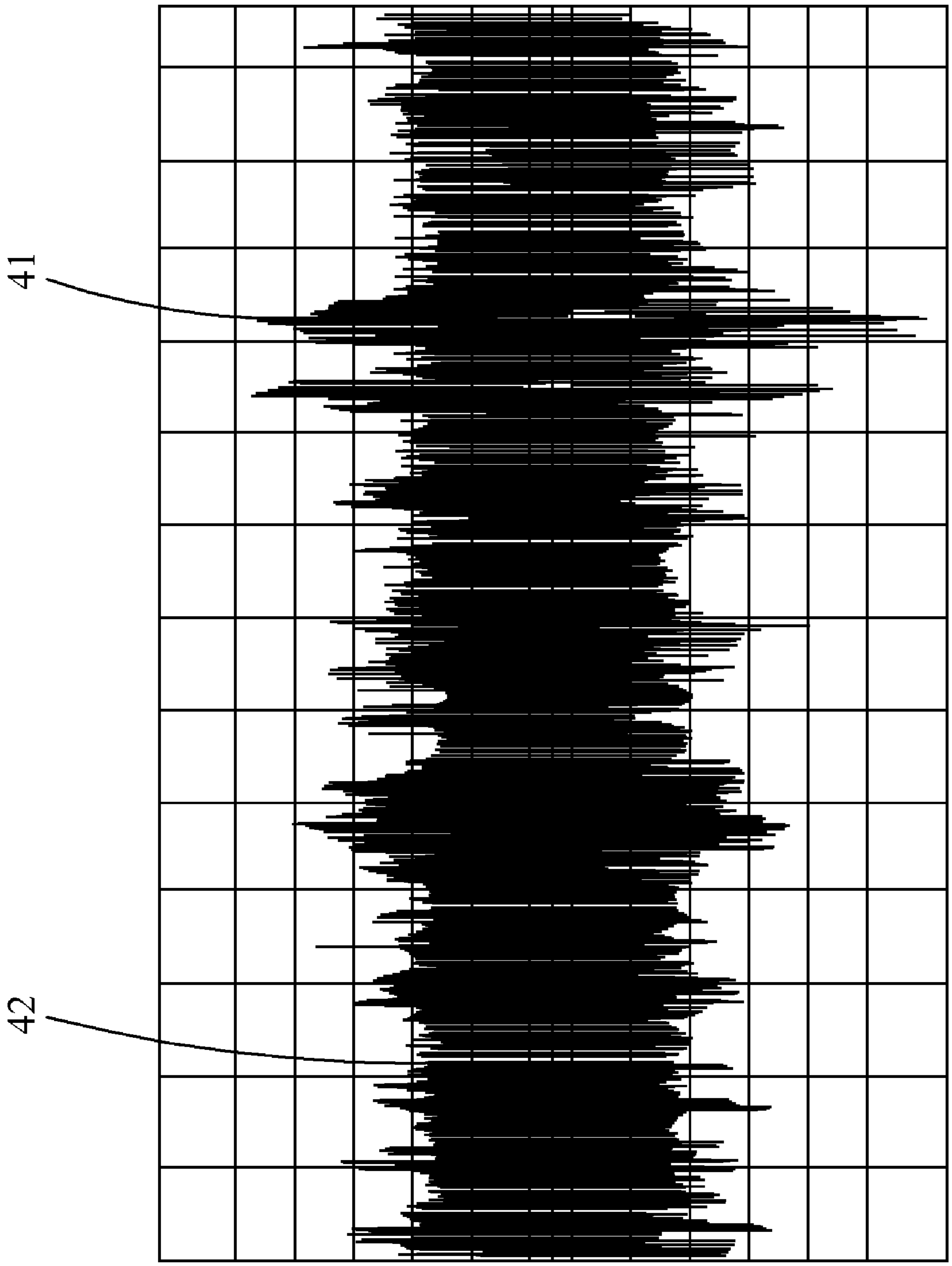
FIG. 7(PRIOR ART)
FIG. 7 is a signal diagram of the signals recorded by a microphone, wherein the signals are analyzed by an independent component analysis (ICA) method according to the prior art.

Referring to FIG. 7, there is illustrated a signal diagram of the signals recorded by a microphone, wherein the signals are analyzed by an independent component analysis (ICA) method according to the prior art. Herein two microphones are used to record the signals from two signal sources, and the signals from the two signal sources are speech signals 41 and noise signals 42. Through the ICA method, two separated signals can be generated. Some of them are speech signals, and the others are noise signals. The signals represented in this figure are a part of the speech signals. Since the spatial aliasing effect is caused due to use of two microphones in recording, it is not significant for the noise reduction effect by directly using the ICA. Through the ICA method, both the noise signals 42 and the speech signals 41 are included in the signals. However, it is impossible to obtain better speech signals 41 because of excessive noise signals 42.

Figure 8:
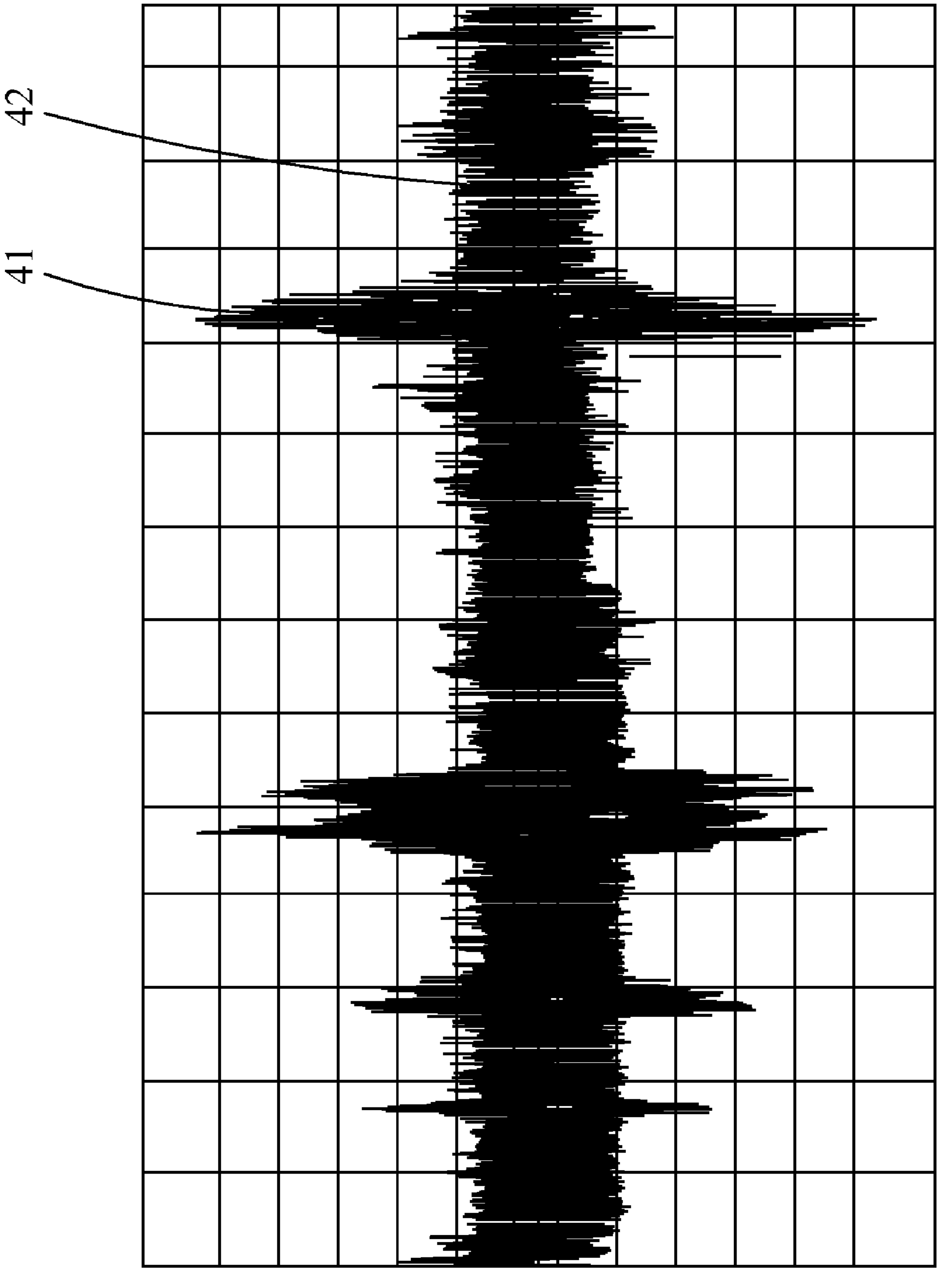
FIG. 8 is a signal diagram of signals generated by an audio-separating apparatus according to the present invention.

Referring to FIG. 8, a signal diagram of signals generated by an audio-separating apparatus according to the present invention is illustrated. Compared to FIG. 4, it can be found that all the original speech signals 41 occur in the signal diagram, and the noise signals 42 are effectively suppressed. Furthermore, compared to FIG. 7, the noise reduction effect is superior to the ICA method so that the hearing impaired can obtain better speech signals by way of this apparatus.

The above description is illustrative only and is not to be considered limiting. Various modifications or changes can be made without departing from the spirit and scope of the invention. All such equivalent modifications and changes shall be included within the scope of the appended claims.

What is claimed is:

1. An audio-separating apparatus comprising:

a receiving unit receiving a mixed sound signal;

a first buffer unit being connected to the receiving unit and the mixed sound signal being stored as a first mixed sound signal in the first buffer unit;

a second buffer unit connected to the receiving unit and the mixed sound signal being stored as a second mixed sound signal in the second buffer unit, and having a buffer capacity different from that of the first buffer unit;

a noise reducing unit being connected to the first buffer unit and the second buffer unit for receiving the first mixed sound signal and the second mixed sound signal, and generating a first noise reduced sound signal and a second noise reduced sound signal respectively by using a noise reduction algorithm;

a learning unit being connected to the first buffer unit and the noise reducing unit, and generating an audio separation parameter by means of a blind source separation algorithm by using the first mixed sound signal and the first noise reduced sound signal; and an audio-separating unit being connected to the noise reducing unit, the second buffer unit and the learning unit, and separating the mixed sound signal by using the second mixed sound signal, the second noise reduced sound signal and the audio separation parameter.

2. The audio-separating apparatus as claimed in claim 1, further comprising an output unit for outputting a separated sound signal that is a sound signal separated from the mixed sound signal and accordingly obtained.

3. The audio-separating apparatus as claimed in claim 1, wherein the buffer capacity of the first buffer unit is greater than the buffer capacity of the second buffer unit.

4. The audio-separating apparatus as claimed in claim 3, wherein the audio-separating unit processes the second mixed sound signal and the second noise reduced sound signal in real-time to separate the mixed sound signal in real-time.

5. The audio-separating apparatus as claimed in claim 1, wherein the blind source separation (BSS) algorithm further comprises an independent component analysis (ICA) algorithm to generate the audio separation parameter.

6. The audio-separating apparatus as claimed in claim 1, wherein the audio separation parameter is a matrix parameter.

7. The audio-separating apparatus as claimed in claim 1, wherein the receiving unit is a microphone for receiving the mixed sound signal.

8. An operation method of an audio-separating apparatus, comprising the following steps:

receiving a mixed sound signal through a receiving unit;

storing the mixed sound signal as a first mixed sound signal in a first buffer unit;

storing the mixed sound signal as a second mixed sound signal in a second buffer unit;

receiving the first mixed sound signal and the second mixed sound signal through a noise reducing unit;

generating a first noise reduced sound signal and a second noise reduced sound signal respectively through the noise reducing unit by using a noise reduction algorithm;

generating an audio separation parameter through a learning unit by means of a blind source separation algorithm by using the first mixed sound signal and the first noise reduced sound signal; and separating the mixed sound signal by an audio-separating unit by using the second mixed sound signal, the second noise reduced sound signal and the audio separation parameter.

9. The operation method as claimed in claim 8, further comprising a step of outputting a separated sound signal through an output unit and wherein the separated sound signal is a sound signal separated from the mixed sound signal and accordingly obtained.

10. The operation method as claimed in claim 8, wherein the second buffer unit has a buffer capacity different from that of the first buffer unit.

11. The operation method as claimed in claim 10, wherein the buffer capacity of the first buffer unit is greater than the buffer capacity of the second buffer unit.

12. The operation method as claimed in claim 11, wherein the audio-separating unit processes the second mixed sound signal and the second noise reduced sound signal in real-time to separate the mixed sound signal in real-time.

13. The operation method as claimed in claim 8, wherein the blind source separation (BSS) algorithm further comprises an independent component analysis (ICA) algorithm to generate the audio separation parameter.

14. The operation method as claimed in claim 8, wherein the audio separation parameter is a matrix parameter.

15. The operation method as claimed in claim 8, wherein when the receiving unit is a microphone, the microphone is used to receive the mixed sound signal.

* * * * *